US006827745B1

(12) United States Patent
Jones et al.

(10) Patent No.: US 6,827,745 B1
(45) Date of Patent: Dec. 7, 2004

(54) MIXTURE OF THP AND A MODERATOR TO TAN LEATHER

(75) Inventors: Christopher Raymond Jones, West Midlands (GB); Gareth Rhys Collins, West Midlands (GB); Robert Eric Talbot, Staffordshire (GB)

(73) Assignee: Rhodia Consumer Specialties Limted, Oldbury (GB)

( * ) Notice: Subject to any disclaimer, the term of this patent is extended or adjusted under 35 U.S.C. 154(b) by 92 days.

(21) Appl. No.: 09/980,413

(22) PCT Filed: Jun. 14, 2000

(86) PCT No.: PCT/EP00/05471

§ 371 (c)(1),
(2), (4) Date: Feb. 6, 2002

(87) PCT Pub. No.: WO00/79011

PCT Pub. Date: Dec. 28, 2000

(30) Foreign Application Priority Data

| Jun. 18, 1999 | (GB) | ................................................ 9914139 |
| Aug. 4, 1999 | (GB) | ................................................ 9918243 |
| Aug. 10, 1999 | (GB) | ................................................ 9918698 |

(51) Int. Cl.[7] ................................................ C14C 3/08

(52) U.S. Cl. ........................ 8/94.21; 8/94.19 R; 8/94.2; 8/94.24; 8/94.25; 8/94.26; 8/94.27; 8/94.1 P

(58) Field of Search ................................ 8/94.19, 94.12, 8/94.21, 94.24, 94.25, 94.26, 94.27, 94.1 P

(56) References Cited

U.S. PATENT DOCUMENTS

| 2,992,879 A |   | 7/1961  | Windus et al. |
| 3,104,151 A | * | 9/1963  | Windus et al. |
| 3,914,106 A |   | 10/1975 | Chance et al. |

FOREIGN PATENT DOCUMENTS

| GB | 2 055 919 A   |   | 3/1981  |
| WO | wo 99/17614   | * | 4/1999  |
| WO | WO 99/23261   |   | 5/1999  |
| WO | WO 00/73513   |   | 12/2000 |

* cited by examiner

*Primary Examiner*—Margret Einsmann
(74) *Attorney, Agent, or Firm*—Frishauf, Holtz, Goodman & Chick, P.C.

(57) ABSTRACT

A mixture of THP and a moderator is used to tan leather. The moderator is selected from metaphosphates and polyhydroxy or polypyrolidyl compounds such as glycerol, carboxydrates PVA or PVP.

13 Claims, No Drawings

MIXTURE OF THP AND A MODERATOR TO TAN LEATHER

This application is a U.S. National Phase Application under 35 USC 371 of International Application PCT/EP00/05471 (published in English) filed Jun. 14, 2000 now WO/79001 A1.

The present invention relates to a novel process for tanning leather.

Tanning is a process for the preservation of skins, by which is meant the collagen-containing integuments of vertebrates including mammals (e.g. cows, pigs, deer, goats, sheep, seals, antelope, mink, stoats and camels), fish, (e.g. sharks), reptiles (e.g. snakes, lizards and crocodiles), and birds (e.g. ostrich). Skins comprise a layer of collagen, and tanning entails reacting the collagen with a cross linking, or tanning, agent to cross link reactive sites within the collagen molecule. The product of the cross linking is leather, which is substantially less susceptible than skin to bacterial degradation.

A consequence of the cross linking is an increase in the minimum temperature at which the wet leather tends to shrink. This shrink temperature is often used as an indication of the degree of tanning.

The collagen layer of the skin is typically separated from fats, connective tissue and other subcutaneous protein, and optionally from the outer keratinous layer, by a combination of chemical and physical steps. The former may include liming, bating, pickling and/or degreasing.

The skin is then subjected to treatment in one or more stages with various tanning agents selected to give the desired end properties.

The main types of tannage are: vegetable tannage, based on tannin as the active cross linking agent; mineral tannage using various polyvalent metal salts, especially salts of chromium, aluminium, iron, or zirconium; and synthetic tanning, agents, referred to as "syntans". Syntans include replacement syntans which are active tanning agents capable of tanning leather when used as the sole tannage e.g. by reacting with collagen at two or more sites to form cross links, and auxiliary syntans which are added to other tannages to modify the character of the leather but which are not in themselves active tanning agents. Auxiliary syntans are absorbed by the leather or may react with collagen at one site only. Syntans include various polymers and copolymers, such as those obtained by condensing formaldehyde with, for example, phenols and/or aryl sulphonates, and acrylate, methacrylate, acrylamide and/or acrylonitrile homopolymers and copolymers. Formaldehyde itself and dialdehydes such as glutaraldehyde are also used in tanning, usually in combination with other tannages.

For centuries the production of leather was based on the vegetable tannages which produce the characteristic brown colour traditionally associated with leather. One of the first mineral tannages was alum, but currently the most widely used tanning agent is chrome, usually in the form of basic chromium sulphate, which produces a blue grey leather with high shrink temperatures. However mineral tannages in general, and chrome tannages in particular are under pressure on environmental grounds. Syntans are less environmentally harmful than mineral tanning agents.

Tetrakis (hydroxymethyl) phosphonium salts which will be referred to herein as "THP salts" have long been used as fire-retardants for textiles and have been applied to the keratinous (fur) side of skins for this purpose. The salts may be applied directly to the fabric or in the form of precondensates which are water soluble or sparingly water soluble copolymers of THP with organic nitrogen compounds such as urea or an amine and which are referred to herein as "THP condensates". THP salts have also been known as possible ingredients of tanning liquors for more than thirty six years. U.S. Pat. No. 2,992,879 referred to THP chloride (THPC) as an unsatisfactory tanning agent on its own, and recommended a combination of THPC and a phenol such as resorcinol speculating that the two react together to form an effective tanning agent when the pH is raised. In fact THP salts do copolymerise with phenols such as resorcinol (see, for example, Textile Research Journal, December 1982, P743). U.S. Pat. No. 3,104,151 describes the use of such THPC phenol copolymers as pretannages for leather in which the main tannage is vegetable or mineral. GB 2 287 953 describes the use of THP salts as cross linkers in conjunction with melamine formaldehyde or urea formaldehyde prepolymers, in order to form a copolymeric tanning agent in situ in the tanning liquor. EP 0 559 867 describes the use of phosphonium salts such as THP sulphate (THPS) on raw or cured skin prior to tanning e.g. in acid degreasing. EP 0 681 030 describes the use of THPS as a cross linker for casein finishes applied to leather after tanning. GB 2 314 342 describes the use of hydroxyalkyl phosphines and phosphonium salts as tanning agents in conjunction with aromatic anionic syntans and EP 0 808 908 describes the use of THP salts with condensable nitrogen compounds.

THP salts are stable under acidic conditions in the absence of air or oxidising agents. At pH above 3 and in the absence of oxidising agents they are gradually converted to the parent base, tris(hydroxymethyl)phosphine commonly referred to as THP. Conversion is rapid and substantially complete between pH of about 4 and 6. Above pH 7, or in the presence of oxidising agents THP salts or THP are converted to tris(hydroxymethyl)phosphine oxide (THPO), conversion being rapid and substantially complete at pH above about 10, e.g. 12. It has been stated, e.g. in U.S. Pat. No. 2,993,744, that THPO is the effective tanning agent in THP based tannages.

Contrary to statements in the art, THPO is not effective as a tanning agent for leather, and THP salts are also ineffective as tannages. Moreover THP used in conjunction with co-condensable monomers or polymers provides complex systems which are difficult to control to obtain consistent results.

WO99/23261 describes the use of THP on its own as an effective main tanning agent. THP is usually most effective when formed in situ by first impregnating the leather with a THP salt, in the substantial absence of monomers or prepolymers which react or copolymerise with THP and raising the pH above 4 and preferably above 5. WO99/23261 also describes the use of THP condensates as main tanning agents.

In addition to THP, compounds of the formula R P(CH$_2$OH)$_2$, referred to herein as "THP analogues", where R is an organic group which does not react chemically with collagen, such as a C$_{1-20}$ alkyl, alkenyl, aryl, aralkyl, alkaryl, polyalkyleneoxy, alkylpolyalkyleneoxy or polyalkyleneoxy alkyl group have been referred to in the literature as highly effective tanning agents.

For convenience "THP" will be used herein, where the context permits, to refer generically to THP, THP salts, THP condensates and THP analogues. A major problem when tanning with derivatives of formaldehyde, including formaldehyde condensate syntans and THP is the evolution of formaldehyde during tanning and the presence of formaldehyde residues in the leather which give rise to objectionable odours and may cause a health hazard to process operators.

The steps required to produce leather including the pickling and degreasing which usually precede tanning, remove most of the natural oils and fats from leather. These are normally at least partially replaced after tanning by fat liquoring, which entails contacting the leather with an aqueous emulsion of oils and fats which soften and lubricate the finished leather. It has been found that leather which has been tanned with THP alone is tight and tends to be relatively hard. It requires high levels of fat liquor to soften it. It would be useful to be able to obtain the advantages of THP, but prepare a fuller, softer and more easily fat liquored leather.

It is often necessary to split, e.g. bovine leather, prior to retanning, in order to obtain the desired thickness. Conventionally tanned leather may split unevenly and the split leather may require substantial shaving to obtain a consistent thickness.

A further problem is swelling of the skin, control of which usually requires the presence of salts such as chloride or sulphate.

One object of the present invention is to provide tannages which exhibit the advantages of THP but provide leather which is fuller, softer and requires less fat liquor than leather tanned with THP alone.

A further object is to provide leather with lower formaldehyde levels during processing and on the finished leather, than are common in tannages based on formaldehyde derivatives. Another object is to provide leather which gives a more even split than conventionally tanned leather.

A further object is to obtain leather with reduced tendency to swell, compared with normal THP tannage.

We have now discovered that mixtures of THP with certain moderators, which appear to interact with THP to mask its OH groups at least partially, can be applied to skins to provide full soft leather which is readily fat liquored, contains reduced formaldehyde levels, is more easily split and shaved and exhibits reduced swelling tendencies.

We have found for example that a mixture of THP with a water soluble metaphosphate or with a water soluble polyhydroxy or polypyrolidone compound containing at least three adjacent, geminal or vicinal > groups or pyrolidone groups provides improved tanning compared with THP alone, and in particular provides a soft, less tight and more easily fat liquored product.

The leather also shows reduced tendency to swelling which may be controlled without the use of salts.

In addition formaldehyde levels, in the process and in the finished leather are substantially less using the aforesaid mixtures than are observed when THP is used alone.

It has also been found that leather tanned using the mixture is more easily shaved and split.

We believe that THP interacts chemically with the polyhydroxy compounds possibly by hydrogen bonding, and that this moderates the reaction with collagen.

Our invention therefore provides a mixture of THP as herein defined with at least one water soluble moderator selected from (A) metaphosphate salts and (B) aliphatic polyhydroxy or polypyrrolidone compounds comprising at least three adjacent, geminal or vicinal

groups where R is hydrogen or an alkyl group, and X is a hydroxyl or pyrrolidone group.

Our invention also provides a method of tanning or degreasing leather which comprises contacting collagen with a mixture as aforesaid.

Preferably the water soluble polyhydroxy or polypyrrolidone compound has a molecular weight less than 200,000, more preferably less than 150,000, most preferably less than 100,000, e.g. less than 75,000. We especially prefer compounds with a mole weight less than 50,000.

The polyhydroxy compounds preferably comprise hydroxy methylene groups which may be adjacent (i.e. directly linked as in glycerol), geminal (i.e. linked to the same carbon atom as in pentaerythritol) or vicinal (i.e. linked to adjacent carbon atoms, as in trimethylolpropane). Thus the polyhydroxy compounds useful in the invention comprise compounds of the formulae:

I.

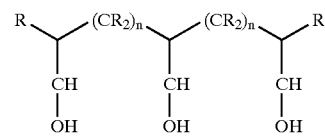

II.

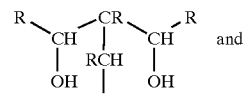

and

III.

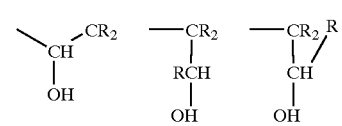

wherein each n may independently be 0, 1 or 2 and each R is independently hydrogen or an alkyl, a hydroxy- or polyhydroxy- alkyl, a carbonyl, a carboxyl, a $C_{1-25}$ acyl, a carbonyl- carboxy- or $C_{1-25}$ acyl- substituted alkyl group or an alkyl group or hydroxy-, carboxy- carbonyl- or $C_{1-25}$ acyl substituted alkyl group which is interrupted by one or more ether or carbonyl linkages or wherein two or more R groups may together constitute one or more alicyclic rings, optionally substituted with one or more hydroxy, carbonyl, carboxy and/or acyl groups and/or interrupted by one or more ether or carbonyl linkages.

The aliphatic polyhydroxy compound may for example be glycerol, sorbitol, trimethylol propane, pentaerythritol, 1,2, 3-trihydroxy butane, 1,2,3,4-tetrahydroxy butane, 1,2,3-trihydroxy pentane, 2,3,4-trihydroxy pentane, tetrahydroxy pentane, pentahydroxy pentane, water soluble carbohydrates including mono and disaccharides and soluble starches and alginates. Examples of suitable carbohydrates include a sucrose, glucose, maltose, lactose, dextrose, fructose, xylose, arabinose, mannose, ribose and rhamnose and dialdehyde starch. The compound may also be a derivative of a carbohydrate including alkyl glycosides such as a $C_{1-25}$ alkyl glucoside or polyglucoside, or ascorbic, mannonic or gluconic acids, or alginates or sorbitol or mannitol or $C_{1-25}$ acyl esters of either sucrose or sorbitan. Generally we prefer not to use nitrogen containing derivatives.

A preferred group of polyhydroxy compounds comprises polyvinyl alcohols and, in particular, relatively low molecular weight polyvinyl alcohols. We prefer PVAs with a mean molecular weight less than 70,000, especially less than 50,000, e.g. less than 30,000.

Also highly effective in modifying the action of THP tannages is polyvinyl pyrrolidone which appears to function in an analogous manner to polyvinyl alcohol.

THP condensates containing high proportions of nitrogen and correspondingly low proportions of uncondensed THP, e.g. less than 4:1 molar THP:nitrogen compound are generally less effective with polyhydroxy or polypyrrolidone compounds than the uncondensed THP. However THP condensed with lower proportions of nitrogen compound e.g. condensates with greater than 4:1, especially greater than 5:1, for instance 5:1 to 7:1 molar THP/nitrogen compound, which contain some free THP, give particularly good results.

The metaphosphate salt is a cyclic condensed phosphate having the formula $(MPO_3)_n$ where M is preferably alkali metal or ammonia, e.g. potassium or most preferably sodium and n is from 2 to 10, preferably 3 to 8. e.g. 5 to 7. Particularly preferred is sodium hexametaphosphate. In principle any water soluble metaphosphate salt of a cation which does not react with THP may be used.

The relative proportion of THP and moderator may be equimolar or may comprise an excess of either component. Preferably the THP is in an excess of up to 20:1 molar, depending on the characteristics required. Generally the higher the proportion of polyhydroxy compound the less tight the leather. Proportions between 10:1 and 2:1 molar are generally preferred.

The THP and moderator may be supplied as or part of a formulated product, premixed or mixed in situ in the tanning operation.

The THP may be used in conjunction with syntans, e.g. by treating the skin with said THP and a syntan (preferably a syntan which does not react with THP under normal tanning conditions) and/or by treating the skin in a plurality of stages at least one of which entails treatment with syntan and at least one other of which entails treatment with the THP.

For the purpose of this specification "syntan" is used to refer to replacement syntans which are synthetic organic compounds capable of reacting with collagen at two or more sites to form cross links and also to auxiliary syntans which do not in themselves contribute substantially to the cross linking but which are physically absorbed by the leather or react at no more than one site so as to modify the physical properties of the leather. For example the term includes any water soluble polymer prepared by copolymerising formaldehyde, which is capable of increasing the shrink resistance of collagen and which comprises at least two units of the formula

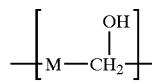

where each M is an aryl group such as a phenyl, naphthyl or aniline group substituted with one or more hydroxyl and/or sulphate, sulphone or sulphonimide groups or a urea or melamine residue. As used herein the term "syntan" also includes resin syntans which are homopolymers and copolymers of unsaturated carboxylic acids or their salts, esters, amides or nitrites, e.g. acrylic acid, methacrylic acid, acrylamide, acrylonitrile, maleic acid, fumaric acid, itaconic acid, aconitic acid, crotonic acid, isocrotonic acid, citraconic acid, mesaconic acid, angelic acid, tiglic acid and cinnamic acid. The copolymers may also comprise other vinylic comonomers such as styrene. Also included are acetone condensates with, for example sulphones and sulphonamides. Resin syntan may modify such properties as dye levelling, filling, grain appearance, break, grain strength, buffing nap, softness and tensile or tear strength.

The THP tends to react with nitrogen containing syntans and with other nitrogenous compounds and also to some extent with aromatic syntans. Such reactions may compete with cross linking reactions of both the THP and the syntan resulting in chaotic behaviour when the two are used together. Such systems are so highly sensitive to the conditions of use that it may be difficult to control them so as to obtain the consistent results required for a viable commercial process.

For these reasons we prefer not to use mixtures with such compounds. However it is possible to precondense the THP with, for example, co-condensable nitrogenous compounds such as urea, melamine, dicyanodiamide and/or aliphatic amines to form condensates comprising two or more phosphorus atoms and having at least two hydroxymethyl groups.

High pH is preferably avoided because it converts the phosphine group to phosphine oxide, which is substantially ineffective as a tanning agent. We prefer that solutions for use according to our invention should have a pH less than 10, more preferably less than 9, especially less than 8, typically less than 7.5, most preferably 4.5 to 7. We prefer that the THP contains less than 15%, more preferably less than 10%, e.g. less than 9% of THPO based on the weight thereof. Generally the less THPO present the better.

The THP is preferably used in a total concentration of from 0.01 to 20% by weight based on the total weight of the tanning liquor, more preferably 0.5 to 10%, e.g. 1 to 5%, most preferably 1.5 to 4%. The total proportion of the THP used is preferably from 0.3 to 20% by weight based on the weight of wet skin, more preferably 1 to 15%, especially 1.5 to 10%, most preferably 2 to 5%.

We particularly prefer processes in which skins are treated with an auxiliary syntan prior to tanning with the THP.

When the mixture is used in combination with a syntan, the latter is preferably a polyacrylate, polymethacrylate, or copolymer of acrylic and/or methacrylic acid with acrylonitrile and/or acrylamide. Typically the polymer has a molecular weight in the range 1,000 to 200,000, more usually 3,000 to 100,000.

The syntan is preferably present at a concentration of from 0.5 to 35% by weight of the tanning liquor. e.g. 1 to 20%, more preferably 2 to 10% especially 3 to 6%. The total proportion of syntan used is preferably from 1 to 20% by weight based on the wet weight of skins, e.g. 2 to 10% especially 3 to 5%.

The proportion by weight of THP to syntan may typically be from 1:10 to 10:1, preferably 1:5 to 2:1, especially 1:2 to 1:1. The total proportion of tannages used is preferably from 2 to 20% active weight based on the wet weight of skins, e.g. 3 to 10%, especially 4 to 8%. The total tannage used preferably comprises more than 80% by weight, more preferably more than 90% by weight, e.g. more than 95% of the THP and syntan. Where white leather is required, we prefer that the total tannages consist essentially of the THP and syntan. In particular we prefer the leather is not tanned with vegetable or mineral tannage.

The THP and polyhydroxy moderator may be used in conjunction with mineral tannages for example, a tannage containing a mixture of THP, chrome and moderator gives strongly synergistic tanning with high shrink temperatures and good area yield using only small amounts of chrome. Combinations of THP, moderator and aluminium salts are particularly preferred, especially aluminium triformate. The latter gives particularly high shrink temperatures. Alternatively the THP tannage may be used as a pretan or re-tan in a mineral tanning operation The THP is preferably applied in the substantial absence of monomers or prepolymers capable of copolymerising with the THP such as phenol, urea, melamine or their precondensates with formaldehyde. For the purposes of this specification, "the substantial absence of monomers or prepolymers" means less than the minimum that would be capable of reacting or copolymerising with 50% of the THP, more preferably less than the minimum that would be required to react or copolymerise with 20%, e.g. less than 5% by weight based on the weight of THP, most preferably less than 2%, especially less than 1%.

The THP may be applied as a first tanning step with a syntan as a retan. Preferably the THP is applied to acidified skins following aqueous degreasing. E.g. the initial pH is typically below 5, e.g. below 4. We prefer that the pH be raised above 5 and preferably maintained above 6 for the main duration of the tanning process.

The skins are preferably agitated in the tanning liquor for a sufficient time to raise the shrink temperature above 75° C., more preferably above 80° C., most preferably above 85° C.

According to a particularly preferred embodiment the polyhydroxy compound is a surfactant such as a $C_{6-25}$ alkyl polyglycoside, sucrose ester or sorbitan ester and the THP and polyhydroxy compound are applied to undegreased or partially degreased skins, in order to effect degreasing or further degreasing thereof.

The tanned skins are typically washed with warm water and fat liquored using a suitable oil or blend of oils. Fat liquoring is normally carried out after dyeing.

The invention will be illustrated by the following examples.

EXAMPLE 1

60 g pickled bovine skin was rotated for 10 minutes with 15% based on the wet weight of skin of 8% sodium chloride solution. 3% based on the wet weigh of skin of 75% by wt. THP solution and 1% sucrose was added and the mixture rotated for 3 hours. The solution was basified to pH 6.5 by adding 2.25% based on the wet weight of skin of sodium bicarbonate and the skins left to rotate overnight.

After the first 3 hours penetration was tested with sodium selenite solution. A pale, even colour indicated even penetration throughout the skin. In contrast a control using THPS without sugar gave only surface action.

After basification a further sample was tested with sodium selenite solution. A strong orange colouration evenly distributed was observed throughout the skin. THP alone gave an uneven colouration. The example was repeated three times using respectively maltose, lactose and D-glucose instead of sucrose, all with similar results.

All the samples gave similar shrink temperatures within the range 81–83° C. except for the lactose which gave a shrink temperature of 78° C., but the THP control felt hard and boardy while the other samples were soft and pliable. All the examples of the invention 1 to 12 described herein showed a reduction in formaldehyde level of between 30 and 45% compared with the control.

EXAMPLE 2

400 g of brine pickled pelt was rotated for 10 minutes with 150% by weight of water based on the wet weight of the skins at pH 4.6. 3% THP based on the wet weight of skins was added as a 75% aqueous solution together with 3%, based on the wet weight of skins, of glycerol. After 3 hours rotation at 35° C. the pH was 3.38 and the shrink temperature was 58° C. After basifying to pH 4.2 with sodium bicarbonate the shrink temperature was 64° C. Basification to pH 5.5 gave a shrink temperature of 68° C. Further basification to pH 6.5 gave a shrink temperature of 77° C.

Testing with sodium selenite showed even penetration and the product was soft and pliable.

EXAMPLE 3

200 gm bovine pickled pelt was rotated overnight with a mixture of 3% based on the wet weight of skin of 75% wt/wt aqueous THPS and 3% based on the wet weight of skin of a 30,000 to 70,000 mole wt polyvinyl alcohol at a pH of 3.5. The pH was then raised to 6.5 with sodium carbonate. After a further hour's rotation the product was full and soft with a shrink temperature of 79° C.

EXAMPLE 4

Example 3 was repeated using a polyvinyl alcohol of molecular weight greater than 70,000. The product was soft but less full than that of Example 3. The shrink temperature was 75° C.

EXAMPLE 5

Example 3 was repeated using a 6:1 molar THPS/urea condensate instead of THPS. The product was soft and fill. The shrink temperature was 78° C.

EXAMPLE 6

Example 3 was repeated using a 3:1 molar THPS/urea condensate. The product was full but less soft than Example 3. The shrink temperature was 76° C.

EXAMPLE 7

Example 6 was repeated using a PVA with a molecular weight greater than 70,000. The product was less tight and hard than that obtained using the urea/THP condensate alone, but not as full as that of Example 6. The shrink temperature was 75° C.

EXAMPLE 8

Example 3 was repeated using polyvinylpyrolidone of mole weight approximately 10,000 in place of PVA. The product was full and soft and had a shrink temperature of 77° C.

EXAMPLE 9

Example 3 was repeated using a 2:1 molar THPS/urea condensate instead of THPS. The product was soft and full, with little residual odour.

EXAMPLE 10

Example 3 was repeated using dialdehyde starch in place of PVA. The product was full and soft.

EXAMPLE 11

60 gm pickled bovine hide was rotated for 10 mins with 150% float containing 8% sodium chloride. 3% THPS/urea condensate (6:1 mole ratio) and 1% dextrose were added and the rotation continued for 3 hours. Small additions of sodium carbonate were made until the pH was 6.5.

Selenium indicator showed good penetration at the end of the three hour rotation. The shrink temperature was 75° C.

The leather was split and shaved prior to retanning with an acrylic resin sytan. The leather gave a more even split than a control without the moderator, and required less shaving.

The retanned leather was washed and fat liquored using 10% by weight of wet skin of a mixed sulphated/sulphited oil fat liquor, and finally dried.

The leather was a very full and soft white leather.

EXAMPLE 12

100 gm bovine skins and 150% water based on wet weight of skin were rotated for 10 minutes with 8% sodium chloride based on wet weight of skin.

3% (based on the wet weight of skin) of a 76% aqueous THPS solution and 3% of sodium hexametaphosphate were rotated for 3 hours at pH 2 to 4 and then basified to pH 6.5.

The product was full and soft with a shrink temperature of 78° C.

What is claimed is:

1. A mixture for use in tanning leather, said mixture comprising:
   (I) a phosphorus-containing compound selected from the group consisting of
      tris(hydroxymethyl)phosphine (THP);
      tetrakis(hydroxymethyl)phosphonium salts (THP$^+$ salts);
      condensates of THP with organic nitrogen compounds (THP condensates); and
      compounds of the formula $RP(CH_2OH)_3$, wherein R is an organic group which does not react chemically with collagen in said leather (THP analogues); and
   (II) at least one water-soluble moderator selected from the group consisting of
      (A) metaphosphate salts and
      (B) aliphatic polyhydroxy or polypyrrolidone compounds selected from the group consisting of sorbitol, glycerol, trimethylolpropane, pentaerythritol, mannitol, mono and di-saccharide sugars, alginates and polyvinyl pyrrolidone.

2. The mixture of claim 1, wherein said phosphorous containing compound consists essentially of a condensate of from 2 to 6 moles THP with 1 mole urea.

3. The mixture of claim 1, wherein said at least one water-soluble moderator is selected from the group consisting of sorbitol, glycerol, trimethylolpropane, pentaerythritol, mannitol, mono and di-saccharide sugars, alginates and polyvinyl pyrrolidone.

4. A method of tanning leather which comprises contacting the collagen in said leather with a tannage comprising the mixture of claim 1.

5. The method of claim 4, further comprising tanning said leather with a syntan and/or a mineral tannage and wherein said mixture is contacted with the collagen in said leather prior to, simultaneously with, or after tanning of said leather with the syntan and/or mineral tannage.

6. The method of claim 4, wherein said leather is fat liquored subsequent to said tanning.

7. The method of claim 4, wherein said leather is shaved and/or split subsequent to said tanning.

8. The mixture of claim 1 wherein the water-soluble moderator is selected from the group consisting of said metaphosphate salts.

9. The mixture of claim 1 comprising THP and moderator in a relative proportion ranging from equimolar amounts up to an excess of THP in a 20:1 molar ratio.

10. The mixture of claim 9 wherein the relative proportion of THP to the moderator is between 10:1 and 2:1 molar.

11. The mixture of claim 9 wherein the water soluble moderator is the (A) metaphosphate salts.

12. The mixture of claim 1 wherein the water soluble moderator is said polyhydroxy compounds.

13. The mixture of claim 1 wherein the water soluble moderator is said polypyrrolidone compounds.

* * * * *